(12) United States Patent
Lehmer et al.

(10) Patent No.: US 6,324,460 B1
(45) Date of Patent: Nov. 27, 2001

(54) PROCESS FOR INFLUENCING THE PARAMETERS OF A CAR'S DYNAMIC BEHAVIOR

(75) Inventors: Ronald Lehmer, Gráven-Wiesbach; Robert Schmidt, Rennerod, both of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/171,899

(22) PCT Filed: Apr. 29, 1997

(86) PCT No.: PCT/EP97/02207

§ 371 Date: May 6, 1999

§ 102(e) Date: May 6, 1999

(87) PCT Pub. No.: WO97/41015

PCT Pub. Date: Nov. 6, 1997

(30) Foreign Application Priority Data

Apr. 29, 1996 (DE) ................................ 196 17 051

(51) Int. Cl.[7] .................................................. B60K 28/10
(52) U.S. Cl. ................................ 701/76; 701/71; 701/83; 30/11; 30/15
(58) Field of Search .................. 701/76, 71, 72, 701/73, 74, 75, 70, 83; 303/15, 16, 11

(56) References Cited

U.S. PATENT DOCUMENTS

| | | | |
|---|---|---|---|
| 3,874,743 | 4/1975 | Fleischer | 303/21 |
| 5,862,503 * | 1/1999 | Eckert et al. | 701/78 |
| 6,035,251 * | 3/2000 | Hac et al. | 701/70 |
| 6,122,584 * | 9/2000 | Lin et al. | 701/70 |

FOREIGN PATENT DOCUMENTS

| | | |
|---|---|---|
| 4 130 370 | 3/1992 | (DE) . |
| 4 333 281 | 9/1993 | (DE) . |
| 4 419 650 | 7/1995 | (DE) . |
| 2 158 533 | 11/1985 | (GB) . |
| 86/07321 | 12/1986 | (WO) . |
| 93/01074 | 1/1993 | (WO) . |
| 93/05991 | 4/1993 | (WO) . |
| 94/12377 | 6/1994 | (WO) . |
| 95/04674 | 2/1995 | (WO) . |
| 95/13946 | 5/1995 | (WO) . |

* cited by examiner

*Primary Examiner*—William A. Cuchlinski, Jr.
*Assistant Examiner*—Olga Hernandez
(74) *Attorney, Agent, or Firm*—Rader, Fishman & Grauer PLLC

(57) ABSTRACT

To set the brake or traction slip of a wheel at the maximum of the frictional value/slip curve, it is necessary that the wheel sensor associated with each wheel to sense its rotational speed is in a state of operation. Otherwise it is not possible to ascertain the slip of the respective wheel. In order to ensure an emergency function for influencing driving dynamics parameters even in the event of malfunction of a wheel sensor, the present invention discloses performing a two-point control when a wheel sensor is defective. A first operating point (A) lies at a longitudinal slip equal to zero, and a second operating point (B) lies at a longitudinal slip of 100%. Without a longitudinal slip, lateral forces can be transmitted to their maximum, whereas at 100% longitudinal slip longitudinal forces can still be transmitted almost to their maximum.

13 Claims, 1 Drawing Sheet

PROCESS FOR INFLUENCING THE PARAMETERS OF A CAR'S DYNAMIC BEHAVIOR

BACKGROUND OF THE INVENTION

The present invention relates to a method of influencing driving dynamics parameters.

A method of this type is disclosed in WO-A 86/07321. This publication refers to adjusting a brake slip value during controlled braking of a vehicle wheel where the coefficient of friction Ti in the longitudinal direction is close to the maximum attainable value, on the one hand, and a sufficient coefficient of friction in the transverse direction is available, on the other hand. This slip value is below the value at which the coefficient of friction in the longitudinal direction is at its maximum. While the frictional value/brake slip curve $\lambda(\mu)$ has the gradient 0 at the maximum coefficient of friction in the longitudinal direction, $\lambda(\mu)$ adopts positive gradients at the slip value to be adjusted. Beside the advantage of higher cornering forces, the prior art concept provides the possibility of definedly limiting yaw torques occurring on the vehicle during controlled braking and, thus, improving the ability to govern the vehicle. To this end, gradient values on the frictional value-slip curve are aimed at in brake pressure control, which are e.g. made responsive to the steering angle or other actual driving conditions. The precondition for this control is that the wheel sensors for ascertaining the individual rotational speeds are in a state of operation. In a road vehicle equipped with four wheel sensors, it cannot be expected that all four wheel sensors stay intact for the total useful life of the vehicle. Upon failure of a wheel sensor, however, a control of the above type is not possible because the brake slip of the respective wheel cannot be ascertained. Usually, brake slip control is disconnected in such cases.

An object of the present invention is to provide a method of the type mentioned hereinabove which provides sort of an emergency function for the control even if at least one wheel sensor is defective.

SUMMARY OF THE INVENTION

This object is achieved by applying, upon malfunction of a wheel sensor, a two-operation-point control on the frictional-value-over-slip curve to the wheel concerned, wherein the operating points on the curve are independent of the rotational speed of the wheel concerned.

The present invention is not limited to vehicles which are equipped with a brake system for brake pressure control on each individual wheel for purposes of brake slip control, traction slip control, or yaw torque control, but is also applicable to vehicles which include a system of distribution of drive torques to each individual wheel. The principle of the present invention is that the method is limited to two operating points on the frictional-value-over-slip curve which are not selected in dependence on the rotational speed of the wheel concerned but rather in dependence on other driving dynamics parameters.

The simplest choice for the first operating point is a longitudinal slip of zero. This means that no drive torques or deceleration torques act upon the wheel concerned. Thus, neither the drive motor nor the brake system acts upon the wheel concerned in this operating point.

This operating point is appropriate for driving situations where the objective is to transmit great cornering forces because the transmission of maximum cornering force is possible at a minimum longitudinal slip.

The second operating point can be determined by a defined deceleration torque or a defined drive torque which is generated by the respective arrangement according to predetermined conditions. It depends on outer circumstances which slip value the controlled wheel adopts.

Most simply, the second operating point is determined by a drive or deceleration device transmitting the maximum possible torque.

Admittedly, the maximum transmittable cornering force is very low at this second operating point, but the frictional value in the longitudinal direction is only slightly below its maximum. Thus, a great amount of longitudinal forces can be transmitted at this second operating point.

Depending on whether, in a determined driving situation, it is the task of the wheel whose wheel sensor has failed to predominantly transmit longitudinal forces or lateral forces, a selection is made between the second and the first operating point.

The idea of the present invention will now be explained in detail by way of the description of a drawing in two Figures.

DETAILED DESCRIPTION OF THE DRAWINGS

In the embodiment chosen, a method which provides brake pressure control for the purpose of yaw torque control is described. The associated brake system includes in addition to a pedal-operated brake pressure source an independent assist pressure source which is used to increase the brake pressure independently of the brake pedal. It shall be pointed out once again that the present invention is not limited to brake systems operated by pressure fluid but is also applicable to brake systems which decelerate the individual wheel in a different manner, for example, by way of electric retarders, or similar provisions.

A conventional method with intact wheel sensors operates as follows: Where the objective is to develop a torque about the vertical axis of the vehicle by an additional longitudinal force during a yaw torque control operation, the build-up of a defined brake pressure on the wheel concerned will adjust a determined operating point on the frictional-value-over-slip curve shown in FIG. 1. The maximum longitudinal force is achieved at the maximum of this curve, consequently, in the slip range between 10 and 25 percent, as a rule.

Figure 1:
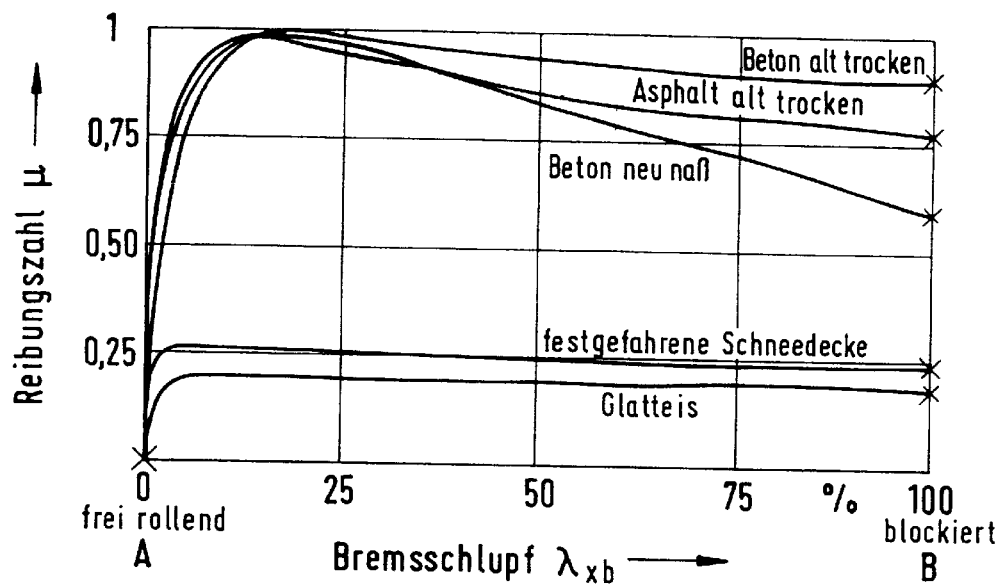
FIG. 1 is a diagrammatic view where the magnitude of friction $\mu$, i.e., the frictional value in a longitudinal direction, is plotted against the brake slip $\lambda_{xb}$.

Upon failure of a wheel sensor, the operating point cannot be adjusted in a defined manner due to the missing information about slip and wheel dynamics. The present invention discloses temporarily selecting the operating point B which is at 100 percent brake slip to transmit a longitudinal force. As is shown in FIG. 1, almost the maximum amount of longitudinal force can still be transmitted at 100 percent brake slip, although the wheel has already been forced to lock. The reason is that, with a locked wheel, the greatest force transmission occurs especially in that direction into which the wheel is just moving.

Figure 2:
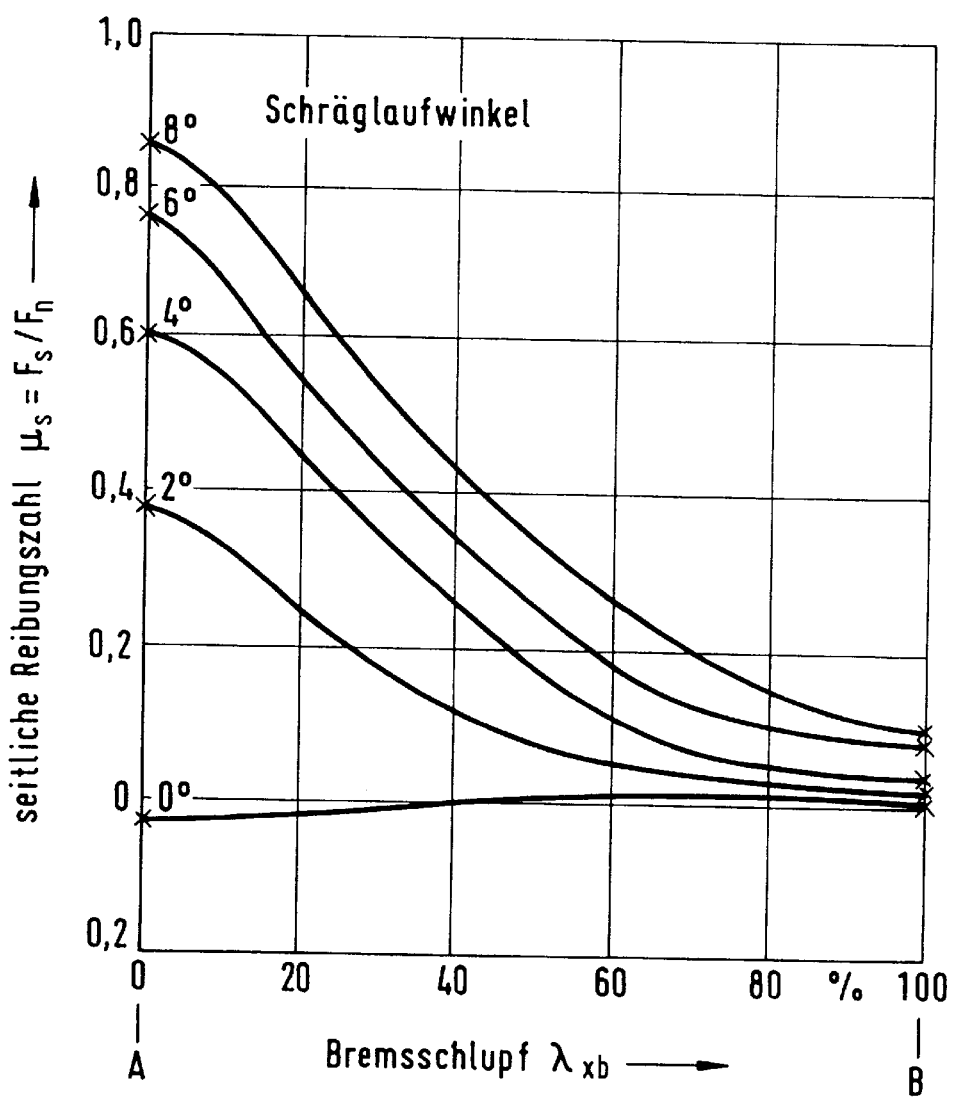
FIG. 2 is a diagrammatic view where the number of lateral friction $\mu_s$, i.e., the lateral frictional value as a parameter of the transmittable cornering force is plotted against the same amount of brake slip $\lambda_{xb}$.

FIG. 2 shows that the transmittable lateral force has decreased to a minimum in this operating point B. If it is the main task of the wheel whose wheel sensor has failed to transmit a high amount of lateral force in the presently prevailing driving situation, the brake pressure is reduced until zero. Accordingly, no brake slip occurs, with the result that the operating point is set to point A. Although no longitudinal force can be transmitted in this operating point A according to FIG. 1, the transmission of lateral force according to FIG. 2 is at its maximum. It is of no importance that this does not apply to a slip angle of zero degree, because an additional intervention of yaw torque control is not required with a slip angle of zero degree. Thus, there is no need to select an operating point in the absence of a slip angle. While the selection of the operating point A is determined by the condition that neither a drive torque nor a deceleration torque acts upon the wheel, the operating point B may be adjusted, for example, by supplying brake pressure to the associated wheel brake which can maximally be produced by the independent assist pressure source. The independent assist pressure source can include a pump and/or an independently controlled brake force booster, for example.

However, the operating point B can also be chosen according to the condition that not necessarily the maximum achievable pressure but a defined pressure value in the wheel brake concerned is adjusted.

The above principle can also be applied in a simple fashion to the distribution of drive torques. With a maximum drive torque generated, the traction slip is at 100 percent, the wheel will spin and, accordingly, the transmission of lateral force is at its minimum. The method is at the same point A as in the embodiments of FIGS. 1 and 2 when no drive torque is applied to the wheel suffering from a malfunction of its wheel sensor.

Thus, the present invention permits an emergency function by a two-operation-point control upon failure of the wheel rotational speed measurement, which is in contrast to the state of the art.

To set the brake or traction slip of a wheel at the maximum of the frictional-value-over-slip curve, it is necessary that the wheel sensor associated with each wheel to sense its rotational speed is in a state of operation. Otherwise it is not possible to ascertain the slip of the respective wheel. In order to ensure an emergency function for influencing driving dynamics parameters even in the event of malfunction of a wheel sensor, a two-operation-point control is performed when a wheel sensor is defective. A first operating point (A) lies at a longitudinal slip equal to zero, and a second operating point (B) lies at a longitudinal slip of 100%. Without a longitudinal slip, lateral forces can be transmitted to their maximum, whereas at 100% longitudinal slip longitudinal forces can still be transmitted almost to their maximum.

The present invention relates to a method of influencing driving dynamics parameters according to the preamble of claim 1.

A method of this type is disclosed in WO-A 86/07321. This publication refers to adjusting a brake slip value during controlled braking of a vehicle wheel where the coefficient of friction $\lambda$ in the longitudinal direction is close to the maximum attainable value, on the one hand, and a sufficient coefficient of friction in the transverse direction is available, on the other hand. This slip value is below the value at which the coefficient of friction in the longitudinal direction is at its maximum. While the frictional value/brake slip curve $\lambda$ ($\mu$) has the gradient 0 at the maximum coefficient of friction in the longitudinal direction, $\lambda$ ($\mu$) adopts positive gradients at the slip value to be adjusted. Beside the advantage of higher cornering forces, the prior art concept provides the possibility of definedly limiting yaw torques occurring on the vehicle during controlled braking and, thus, improving the ability to govern the vehicle. To this end, gradient values on the frictional value-slip curve are aimed at in brake pressure control, which are e.g. made responsive to the steering angle or other actual driving conditions. The precondition for this control is that the wheel sensors for ascertaining the individual rotational speeds are in a state of operation. In a road vehicle equipped with four wheel sensors, it cannot be expected that all four wheel sensors stay intact for the total useful life of the vehicle. Upon failure of a wheel sensor, however, a control of the above type is not possible because the brake slip of the respective wheel cannot be ascertained. Usually, brake slip control is disconnected in such cases.

An object of the present invention is to provide a method of the type mentioned hereinabove which provides sort of an emergency function for the control even if at least one wheel sensor is defective.

This object is achieved in conjunction with the characterizing features of claim 1. The present invention is not limited to vehicles which are equipped with a brake system for brake pressure control on each individual wheel for purposes of brake slip control, traction slip control, or yaw torque control, but is also applicable to vehicles which include a system of distribution of drive torques to each individual wheel. The principle of the present invention is that the method is limited to two operating points on the frictional value/slip curve which are not selected in dependence on the rotational speed of the wheel concerned but rather in dependence on other driving dynamics parameters.

The simplest choice for the first operating point is a longitudinal slip of zero. This means that no drive torques or deceleration torques act upon the wheel concerned. Thus, neither the drive motor nor the brake system acts upon the wheel concerned in this operating point.

This operating point is appropriate for driving situations where the objective is to transmit great cornering forces because the transmission of maximum cornering force is possible at a minimum longitudinal slip.

The second operating point can be determined by a defined deceleration torque or a defined drive torque which is generated by the respective arrangement according to predetermined conditions. It depends on outer circumstances which slip value the controlled wheel adopts.

Most simply, the second operating point is determined by a drive or deceleration device transmitting the maximum possible torque.

Admittedly, the maximum transmittable cornering force is very low at this second operating point, but the frictional value in the longitudinal direction is only slightly below its maximum. Thus, a great amount of longitudinal forces can be transmitted at this second operating point.

Depending on whether, in a determined driving situation, it is the task of the wheel whose wheel sensor has failed to predominantly transmit longitudinal forces or lateral forces, a selection is made between the second and the first operating point.

The idea of the present invention will now be explained in detail by way of the description of a drawing in two Figures. In the drawing, FIG. 1 is a diagrammatic view where the magnitude of friction $\lambda$, i.e., the frictional value in a longitudinal direction, is plotted against the brake slip $\mu_{xb}$.

FIG. 2 is a diagrammatic view where the number of lateral friction $\mu_s$, i.e., the lateral frictional value as a parameter of the transmittable cornering force is plotted against the same amount of brake slip $\mu_{xb}$.

In the embodiment chosen, a method which provides brake pressure control for the purpose of yaw torque control is described. The associated brake system includes in addition to a pedal-operated brake pressure source an independent assist pressure source which is used to increase the brake pressure independently of the brake pedal. It shall be pointed out once again that the present invention is not limited to brake systems operated by pressure fluid but is also applicable to brake systems which decelerate the individual wheel in a different manner, for example, by way of electric retarders, or similar provisions.

A conventional method with intact wheel sensors operates as follows: Where the objective is to develop a torque about the vertical axis of the vehicle by an additional longitudinal force during a yaw torque control operation, the build-up of a defined brake pressure on the wheel concerned will adjust a determined operating point on the frictional value/slip curve shown in FIG. 1. The maximum longitudinal force is achieved at the maximum of this curve, consequently, in the slip range between 10 and 25 percent, as a rule.

Upon failure of a wheel sensor, the operating point cannot be adjusted in a defined manner due to the missing information about slip and wheel dynamics. The present invention discloses temporarily selecting the operating point B which is at 100 percent brake slip to transmit a longitudinal force. As is shown in FIG. 1, almost the maximum amount of longitudinal force can still be transmitted at 100 percent brake slip, although the wheel has already been forced to lock. The reason is that, with a locked wheel, the greatest force transmission occurs especially in that direction into which the wheel is just moving.

FIG. 2 shows that the transmittable lateral force has decreased to a minimum in this operating point B. If it is the main task of the wheel whose wheel sensor has failed to transmit a high amount of lateral force in the presently prevailing driving situation, the brake pressure is reduced until zero. Accordingly, no brake slip occurs, with the result that the operating point is set to point A. Although no longitudinal force can be transmitted in this operating point A according to FIG. 1, the transmission of lateral force according to FIG. 2 is at its maximum. It is of no importance that this does not apply to a slip angle of zero degree, because an additional intervention of yaw torque control is not required with a slip angle of zero degree. Thus, there is no need to select an operating point in the absence of a slip angle. While the selection of the operating point A is determined by the condition that neither a drive torque nor a deceleration torque acts upon the wheel, the operating point B may be adjusted, for example, by supplying brake pressure to the associated wheel brake which can maximally be produced by the independent assist pressure source. The independent assist pressure source can include a pump and/or an independently controlled brake force booster, for example.

However, the operating point B can also be chosen according to the condition that not necessarily the maximum achievable pressure but a defined pressure value in the wheel brake concerned is adjusted.

The above principle can also be applied in a simple fashion to the distribution of drive torques. With a maximum drive torque generated, the traction slip is at 100 percent, the wheel will spin and, accordingly, the transmission of lateral force is at its minimum. The method is at the same point A as in the embodiments of FIGS. 1 and 2 when no drive torque is applied to the wheel suffering from a malfunction of its wheel sensor.

Thus, the present invention permits an emergency function by a two-point control upon failure of the wheel rotational speed measurement, which is in contrast to the state of the art.

What is claimed is:

1. A method of influencing dynamic parameters of a vehicle equipped with one wheel sensor for each vehicle wheel to determine individual rotational wheel speeds, the method comprising the step of:

upon malfunction of a wheel sensor, applying a two-operation-point control on the frictional-value-over-slip curve to the wheel with the malfunctioning wheel sensor, wherein the two operation points on the curve are independent of the rotational speed of the wheel with the malfunctioning wheel sensor.

2. Method as claimed in claim 1, wherein one operating point is disposed at a longitudinal slip equaling zero.

3. Method as claimed in claim 2, wherein the one operating point is selected when the objective is to transmit high cornering forces.

4. Method as claimed in claim 1, wherein the other operating point is disposed at a longitudinal slip which occurs during application of a predetermined longitudinal torque to a wheel.

5. Method as claimed in claim 4, wherein the other operating point is disposed at the longitudinal slip which is the maximum amount achievable on the affected wheel by a deceleration or drive device that operates independently of a vehicle driver.

6. Method as claimed in claim 5, wherein the second operating point is selected when transmission of a large amount of longitudinal force is required.

7. A method which provides braking pressure control for the purpose of yaw torque control of a body in motion, the method comprising the steps of:

receiving wheel sensor output signals; and determining from the wheel sensor output signals whether a wheel sensor for a wheel has malfunctioned;

wherein if the wheel sensor has malfunctioned, applying a two-operation-point control having a first operating point and a second operating point on a friction-value-over-slip curve for the wheel with the malfunctioning wheel sensor to determine a brake pressure for the wheel with the malfunctioning wheel sensor for the purpose of yaw torque control of the body in motion.

8. The method of claim 7, wherein the first operating point is disposed at a longitudinal slip of approximately zero.

9. The method of claim of claim 8, wherein the first operating point is selected to yield a high lateral force to the body in motion.

10. The method of claim 7, wherein the second operating point is disposed at a longitudinal slip that occurs during application of a predetermined longitudinal torque to a wheel.

11. The method of claim 10, wherein the second operating point is disposed at the maximum longitudinal slip achieved on the wheel.

12. The method of claim 11, wherein the maximum achievable longitudinal slip occurs on the wheel by one of a deceleration device and a drive device operating independently of a driver.

13. The method of claim 12, wherein the second operating point is selected when transfer of a longitudinal force of approximately the maximum amount of longitudinal force available is required.

* * * * *